United States Patent [19]
Inoue et al.

[11] Patent Number: 5,489,471
[45] Date of Patent: Feb. 6, 1996

[54] WHITE RESIN FILM WITH EXCELLENT PRINTABILITY

[75] Inventors: Masayuki Inoue; Mitsuo Nakajima, both of Ibaraki, Japan

[73] Assignee: Oji Yuka Goseishi Co., Ltd., Tokyo, Japan

[21] Appl. No.: 309,659

[22] Filed: Sep. 21, 1994

[30] Foreign Application Priority Data

Oct. 5, 1993 [JP] Japan .................................. 5-271157

[51] Int. Cl.$^6$ ............................................. B23B 3/26
[52] U.S. Cl. .................. 428/304.4; 428/195; 428/307.3; 428/323; 428/330; 428/340; 428/500
[58] Field of Search ..................... 428/195, 206, 428/212, 304.4, 306.6, 307.3, 313.5, 314.2, 315.5, 317.3, 317.9, 323, 330, 340, 500

[56] References Cited

U.S. PATENT DOCUMENTS

| | | | |
|---|---|---|---|
| 4,341,880 | 7/1982 | Toyoda et al. | 524/101 |
| 4,460,637 | 7/1984 | Miyamoto et al. | 428/212 |
| 4,663,216 | 5/1987 | Toyoda et al. | 428/212 |
| 5,176,953 | 1/1993 | Jacoby et al. | 428/315.5 |
| 5,204,188 | 4/1993 | Nitta et al. | 428/476.3 |
| 5,397,637 | 3/1995 | Asami et al. | 428/323 |

FOREIGN PATENT DOCUMENTS 62-227933  10/1987  Japan.
1-56091    11/1989  Japan.

*Primary Examiner*—Patrick J. Ryan
*Assistant Examiner*—William A. Krynski
*Attorney, Agent, or Firm*—Oblon, Spivak, McClelland, Maier & Neustadt

[57] ABSTRACT

A white resin film having microvoids is disclosed, which is obtained by stretching a thermoplastic resin film comprising (a) from 40 to 65% by weight of a polypropylene resin, (b) from 1 to 20% by weight of ground calcium carbonate having a particle size of from 1 to 6 μm and a specific surface area of from 10,000 to 34,800 cm$^2$/g, and (c) from 30 to 50% by weight of precipitated calcium carbonate having a particle size of not smaller than 0.5 μm and a specific surface area of from 35,000 to 50,000 cm$^2$/g so as to have a void volume of from 20 to 70%. The film exhibits satisfactory printability in terms of whiteness and ink drying properties.

12 Claims, No Drawings

WHITE RESIN FILM WITH EXCELLENT PRINTABILITY

FIELD OF THE INVENTION

This invention relates to a microvoid-containing white resin film having excellent printability. The resin film of the present invention is useful as poster paper or sticker paper for outdoor use, water-resistant label paper, water-resistant book paper, etc.

BACKGROUND OF THE INVENTION

Synthetic paper having microvoids in the inside which is obtained by stretching a thermoplastic resin sheet containing calcium carbonate powder, as disclosed in JP-B-60-36173 (the term "JP-B" as used herein means an "examined published Japanese patent application"), JP-B-1-56091, U.S. Pat. Nos. 4,341,880 and 5,204,188, and JP-A-62-227933 (the term "JP-A" as used herein means an "unexamined published Japanese patent application"), is superior to pulp paper in water resistance and strength and therefore useful as outdoor posters, stickers for vending machines, labels of detergent bottles or frozen foods, and lately as paper for books that one can read while taking a bath.

Compared with pulp paper, the void-whitened synthetic paper using calcium carbonate for void formation on stretching is disadvantageous in that printing inks applied thereto have poor drying properties because the matrix thereof contains polyolefins having no polar group, such as polypropylene and polyethylene.

In addition, calcium carbonate particles fall off during offset printing and enter the printing ink via the rubber blanket. As a result, the ink fluidity is reduced and fails to be transferred smoothly from the printing machine to printing paper, resulting in poor print quality, as pointed out in JP-A-56-137960. This phenomenon is hereinafter called paper dust trouble.

To overcome these problems, coated paper prepared by coating the polyolefin-based synthetic paper with a pigment coating material usually comprising a filler, e.g., clay or silica, and a binder, e.g., polyvinyl alcohol or a styrene-butadiene latex, has been supplied. However, application of a pigment coat for improvement of ink drying properties means involvement of an extra step, which is not economical.

SUMMARY OF THE INVENTION

An object of the present invention is to economically provide synthetic paper which exhibits satisfactory ink drying properties as well as high whiteness.

The present invention provides a white resin film having microvoids which is obtained by stretching a thermoplastic resin film comprising (a) from 40 to 65% by weight of a polypropylene resin, (b) from 1 to 20% by weight of ground calcium carbonate having a particle size of from 1 to 6 μm, and (c) from 30 to 50% by weight of precipitated calcium carbonate having a particle size of not smaller than 0.5 μm.

DETAILED DESCRIPTION OF THE INVENTION

The polypropylene resin as component (a) includes propylene homopolymers and copolymers of propylene and an α-olefin, such as ethylene, 1-butene, 1-hexene, 1-heptene or 4-methyl-1-pentene. The propylene copolymer may be a random copolymer or a block copolymer. The proportion of the α-olefin based on the amount of the propylene copolymer is from 0.5 to 25% by weight.

In particular, a polypropylene resin having a melt flow rate (as measured at 230° C. under a 2.16 kg load according to JIS K-7210; hereinafter abbreviated as MFR) of from 0.5 to 50 g/10 min, a degree of crystallinity (as measured by an X-ray method) of not less than 20%, preferably from 40 to 75%, and a melting point between 140° C. and 190° C. is preferred.

Component (b) is ground calcium carbonate which is obtained by finely grinding limestone by means of a hammer mill, etc. and classified so as to have a particle size of from 1 to 6 μm, preferably from 3 to 4 μm. The terminology "particle size" as used herein means a cumulative 50 wt % diameter as measured with a laser diffraction particle size measuring apparatus (MICROTRACK, manufactured by Nikkiso K.K.).

Calcium carbonate grinds having a particle size of less than 1 μm are uneconomical and impractical. Those greater than 6 μm only provide synthetic paper with a rough surface, which has low gloss when offset printed and is therefore unsuitable as poster paper.

The ground calcium carbonate preferably has a specific surface area of from 10,000 to 34,800 $cm^2/g$ as measured with a constant pressure aeration specific surface area measuring apparatus (SS-100, manufactured by Shimadzu Corporation).

The precipitated calcium carbonate can be prepared, for example, by a method comprising blowing carbonic acid gas into milk of lime, an aqueous suspension of quick lime, to precipitate crystalline calcium carbonate, a method comprising enlarging the above crystalline calcium carbonate as a nucleus in milk of lime into which carbonic acid gas is blown, or a method of reacting soda ash with calcium chloride. The precipitated calcium carbonate as component (c) preferably has a particle size of from 0.5 to 3 μm, more preferably from 1 to 2 μm, as measured with the MICROTRACK apparatus. If the particle size of component (c) is less than 0.5 μm, voids are hardly formed, resulting in an insufficient degree of whiteness, and so-called color depression becomes conspicuous. The color depression is a phenomenon in which the optical density of the printed ink is lower than that designed due to a shortage of the ink transferred from the printing machine to the paper or unevenness of the printed ink film which occurs during ink drying and, as a result, the printing finish becomes dull and less impressive. The precipitated calcium carbonate preferably has a specific surface area of from 35,000 to 50,000 $cm^2/g$.

The thermoplastic resin sheet comprising components (a), (b) and (c) may further contain other components, such as thermal stabilizers, ultraviolet absorbents, antioxidants, lubricants, and dispersants. If desired, up to 30% by weight of the polypropylene resin as component (a) may be replaced with high-density polyethylene, linear low-density polyethylene, branched low-density polyethylene, and the like.

A weight ratio of component (c) to component (b), i.e., (c)/(b) is preferably not less than 2 from the standpoint of ink drying properties and not more than 30 from the standpoint of prevention of color depression.

If the total calcium carbonate content, i.e., the total amount of components (b) and (c), is less than 31% by weight, the void volume of the stretched film is too small to secure sufficient whiteness. If it exceeds 60% by weight, the paper dust trouble arises. That is, calcium carbonate particles having fallen off during printing enter an offset printing ink to thicken the ink, making the transfer of ink on the paper difficult, or calcium carbonate particles fall off from the prints, causing white spots.

If the proportion of component (b) is less than 1% by weight, color depression occurs. If it exceeds 20% by weight, paper dust trouble takes place.

If the proportion of component (c) is less than 30% by weight, no effect of improving ink drying properties can be produced. If it exceeds 50% by weight, color depression will result.

A composition comprising components (a), (b) and (c) and additives, if desired, is melt-kneaded in an extruder and molded into sheeting by blown film extrusion or T-die extrusion. The resulting thermoplastic sheeting is stretched at least uniaxially at a temperature lower than the melting point of the polypropylene resin to obtain the white resin film of the present invention.

The stretching of the thermoplastic resin sheet can be carried out uniaxially in the machine direction or the transverse direction or biaxially in the transverse direction and the machine direction by means of a tenter, a mandrel, a plurality of rolls, and the like.

The stretch ratio depends on the quality demanded, the stretching process and the material of the sheet. In general, it is from 4 to 12 when using a tenter; from 1.3 to 4 when using a mandrel; and from 2.5 to 7 when using rolls.

The stretching temperature is 3° to 20° C. lower than the melting point of the polypropylene resin as component (a). For example, when a propylene homopolymer is used as component (a), the stretching temperature therefor is from 140° to 162° C., preferably from 150° to 160° C.

If desired, the surface of the thus stretched film may be subjected to a sizing treatment, a corona discharge treatment, and the like.

The white resin film of the present invention preferably has a void volume of from 20 to 70%, more preferably from 25 to 50%, as calculated according to the following formula:

Void Volume (%)=(Film Density before Stretching—Film Density after Stretching)/Film Density Before Stretching×100

Further, the white resin film of the present invention preferably has a degree of whiteness of not less than 80%, more preferably from 90 to 100%, as measured according to JIS L-1015.

When offset printed, the white resin film according to the present invention exhibits excellent ink drying properties and involves neither paper dust trouble nor color depression.

The present invention will now be illustrated in greater detail with reference to Examples, but it should be understood that the present invention is not construed as being limited thereto. All the parts are given by weight unless otherwise indicated.

EXAMPLE 1

A composition consisting of 55 parts of a propylene homopolymer having an MFR of 4 g/10 min (MITSUBISHI POLYPRO MA-4 produced by Mitsubishi Petrochemical Co., Ltd.), 5 parts of ground calcium carbonate having a cumulative 50 wt % diameter of 3.5 µm as measured with the MICROTRACK apparatus and a specific surface area of 16,000 $cm^2$/g (SOFTON 1800 produced by Bihoku Funka K.K.), and 40 parts of precipitated calcium carbonate having a particle size of 1.5 µm and a specific surface area of 39,000 $cm^2$/g (BRILLIANT 15 produced by Shiraishi Kogyo K.K.) was melt-kneaded in a twin-screw extruder (manufactured by Tosoku Seimitsu) set at 240° C., extruded through a die into strands, cooled, and cut into pellets. The resulting pellets were melted and compressed in a press machine set at 230° C. and cooled to obtain a pressed sheet of 120 mm in length, 120 mm in width, and 1.5 mm in thickness.

The pressed sheet was heated to 160° C. and stretched simultaneously in the machine direction at a stretch ratio of 5 and in the transverse direction at a stretch ratio of 5 by means of a midget biaxial stretching machine (manufactured by Iwamoto Seisakusho), followed by annealing at 163° C. for 30 seconds.

The thus obtained stretched film had a void volume of 39% and a degree of whiteness of 92%.

The resulting film was evaluated in terms of ink drying properties and color depression according to the following methods. The results obtained are shown in Table 1 below.

1) Ink Drying Properties

The whole surface of a cut resin film was printed on an offset printing press using a commercially available offset ink for synthetic paper (BEST SP PROCESS BLACK, produced by T & K Toka) with the amount of the ink transferred being 1.5 g/$m^2$. Non-printed synthetic paper (YUPO FPG80, produced by Oji Yuka Goseishi Co., Ltd.; thickness: 80 µm) was superposed on the printed surface of the resin film, and a line was drawn on the surface of the synthetic paper with a ball-point pen every 5 minutes. The time required until the printed ink on the resin film no longer caused set-off on the back side of the synthetic paper was taken as an ink drying time. Films having an ink drying time of 30 minutes or less were regarded to be practical.

2) Color Depression

The whole surface of a cut resin film was printed solid on an offset printing press using a commercially available offset ink for synthetic paper (BEST SP PROCESS MAGENTA, produced by T & K Toka) with the amount of the ink transferred being 2 g/$m^2$. After the ink was dried, the optical reflective density of the printed surface was measured with a densitometer (MACBETH, manufactured by Sakata Inks K.K.). Films having a density of 1.50 or higher were regarded to be practical.

EXAMPLES 2 TO 4 AND COMPARATIVE EXAMPLES 1 TO 5

A stretched film was prepared in the same manner as in Example 1, except for using the composition shown in Table 1. The ink drying properties and color depression were evaluated in the same manner as in Example 1. The results obtained are shown in Table 1.

The film of Comparative Example 5 had a void volume as low as 18% and was not white. Unsuitable as printing paper, the film was not tested.

EXAMPLES 5 TO 7 AND COMPARATIVE EXAMPLE 6

A stretched film was prepared in the same manner as in Example 1, except for changing the particle size of calcium carbonate as component (b) or (c) as shown in Table 1, and the ink drying properties and color depression were evaluated. The results obtained are shown in Table 1.

The film of Comparative Example 6 had a void volume as low as 17% and was not white. Unsuitable as printing paper, the film was not tested.

an offset two-color printing press (DIA INSATSUKI, manufactured by Mitsubishi Heavy Industries, Ltd.) using offset inks of the TSP-400 series (produced by Toyo Ink Mfg. Co.,

TABLE 1

| Example No. | Polypropylene Resin (a) (wt %) | Ground CaCO$_3$ (b) | | | Precipitated CaCO$_3$ (c) | | | White Resin Film | | |
|---|---|---|---|---|---|---|---|---|---|---|
| | | Particle Size (μm) | Specific Surface Area (cm$^2$/g) | Amount (wt %) | Particle Size (μm) | Specific Surface Area (cm$^2$/g) | Amount (wt %) | Void Volume (%) | Ink Drying Properties (min) | Color Depression |
| Example 1 | 55 | 3.5 | 16000 | 5 | 1.5 | 39000 | 40 | 39 | 15 | 1.67 |
| Example 2 | 62 | 3.5 | 16000 | 5 | 1.5 | 39000 | 33 | 29 | 20 | 1.74 |
| Example 3 | 48 | 3.5 | 16000 | 5 | 1.5 | 39000 | 47 | 49 | 5 | 1.56 |
| Example 4 | 42 | 3.5 | 16000 | 15 | 1.5 | 39000 | 43 | 59 | 10 | 1.79 |
| Example 5 | 55 | 1.5 | 31000 | 5 | 1.5 | 39000 | 40 | 37 | 10 | 1.62 |
| Example 6 | 55 | 5 | 12000 | 5 | 1.5 | 39000 | 40 | 41 | 20 | 1.73 |
| Example 7 | 55 | 3.5 | 12000 | 5 | 1.1 | 41000 | 40 | 38 | 5 | 1.56 |
| Compara. Example 1 | 60 | 3.5 | 16000 | 15 | 1.5 | 39000 | 25 | 36 | 120 | 1.81 |
| Compara. Example 2 | 42 | 3.5 | 16000 | 5 | 1.5 | 39000 | 53 | 52 | 5 | 1.39 |
| Compara. Example 3 | 55 | — | — | 0 | 1.5 | 39000 | 45 | 34 | 15 | 1.46 |
| Compara. Example 4 | 55 | 3.5 | 16000 | 45 | — | — | 0 | 42 | >180 | 1.83 |
| Compara. Example 5 | 70 | 3.5 | 16000 | 5 | 1.5 | 39000 | 25 | 18 | — | — |
| Compara. Example 6 | 55 | 3.5 | 16000 | 5 | 0.1* | — | 40 | 17 | — | — |

Note: *"HAKUENKA O" produced by Shiraishi Kogyo K.K.

EXAMPLE 8

A composition consisting of 70% by weight of polypropylene having an MFR of 0.8 g/10 min and a melting point of 167° C., 20% by weight of ground calcium carbonate having a particle size of 3.5 μm, and 10% by weight of high-density polyethylene having a melt index of 11 g/10 min was melt-kneaded in an extruder at 260° C., extruded into a film through a die set at 250° C., and cooled to about 60° C. by means of cooling rolls. The film was heated to 145° C. and stretched in the machine direction at a stretch ratio of 5 by making use of the difference in peripheral speed of the rolls.

A composition consisting of 50% by weight of polypropylene having an MFR of 10 g/10 min and a melting point of 167° C., 5% by weight of ground calcium carbonate having a particle size of 2 μm and a specific surface area of 26,000 cm$^2$/g, 40% by weight of precipitated calcium carbonate having a particle size of 1.5 μm and a specific surface area of 38,000 cm$^2$/g, and 5% by weight of high-density polyethylene having a melt index of 11 g/10 min was melt-kneaded in an extruder at 270° C., extrusion laminated through a T-die on both sides of the above prepared stretched film.

The resulting laminate was heated up to 155° C. and stretched in the transverse direction at a stretch ratio of 8.5 by means of a tenter, followed by annealing at 158° C. After cooling to 60° C., the laminate was trimmed to obtain a white stretched resin film having a three-layered structure (25 μm/50 μm/25 μm).

The resulting resin film had a void volume of 28%, a degree of whiteness of 93%, and an ink drying time of 20 minutes. The optical reflective density, indicative of the degree of color depression, was as satisfactory as 1.72.

The film was cut to a size of 788 mm in length and 545 mm in width, and the cut films were printed in two colors on Ltd.) to obtain 2000 copies. No sign of paper dust trouble was observed up to 2000 prints.

COMPARATIVE EXAMPLE 7

A composition consisting of 70% by weight of polypropylene having an MFR of 0.8 g/10 min and a melting point of 167° C., 20% by weight of ground calcium carbonate having a particle size of 3.5 μm, and 10% by weight of high-density polyethylene having a melt index of 11 g/10 min was melt-kneaded in an extruder at 260° C., extruded into sheeting through a die set at 250° C., and cooled to about 60° C. by means of cooling rolls. The sheeting was heated to 145° C. and stretched in the machine direction at a stretch ratio of 5 by making use of the difference in peripheral speed of the rolls.

A composition consisting of 32% by weight of polypropylene having an MFR of 10 g/10 min and a melting point of 167° C., 25% by weight of ground calcium carbonate having a particle size of 2 μm and a specific surface area of 26,000 cm$^2$/g, 40% by weight of precipitated calcium carbonate having a particle size of 1.5 μm and a specific surface area of 38,000 cm$^2$/g, and 3% by weight of high-density polyethylene having a melt index of 11 g/10 min was melt-kneaded in an extruder at 270° C., extrusion laminated through a T-die on both sides of the above prepared stretched film.

The resulting laminate was heated up to 155° C. and stretched in the transverse direction at a stretch ratio of 8.5 by means of a tenter, followed by annealing at 158° C. After cooling to 60° C., the laminate was trimmed to obtain a white stretched resin film having a three-layered structure (25 μm/50 μm/25 μm).

The resulting resin film had a void volume of 38%, a degree of whiteness of 94%, and an ink drying time as long as 45 minutes. The optical reflective density of prints was 1.80.

When the film was printed in the same manner as in Example 8, reduction in print quality below a practical level was observed on the ground of paper dust when 600 prints were obtained.

While the invention has been described in detail and with reference to specific examples thereof, it will be apparent to one skilled in the art that various changes and modifications can be made therein without departing from the spirit and scope thereof.

What is claimed is:

1. A white resin film having microvoids which is obtained by stretching a thermoplastic resin film comprising (a) from 40 to 65% by weight of a polypropylene resin, (b) from 1 to 20% by weight of ground calcium carbonate having a particle size of from 1 to 6 µm, and (c) from 30 to 50% by weight of precipitated calcium carbonate having a particle size of not smaller than 0.5 µm, wherein the total amount of said ground calcium carbonate (b) and said precipitated calcium carbonate (c) is not more than 60% by weight.

2. A white resin film as claimed in claim 1, wherein said ground calcium carbonate has a specific surface area of from 10,000 to 34,800 cm$^2$/g, and said precipitated calcium carbonate has a specific surface area of from 35,000 to 50,000 cm$^2$/g.

3. A white resin film as claimed in claim 1, wherein the weight ratio (c)/(b) of said precipitated calcium carbonate (c) to said ground calcium carbonate (b) is from 2 to 30.

4. A white resin film as claimed in claim 1, wherein said white resin film has a degree of whiteness of not less than 80%.

5. A white resin film as claimed in claim 1, wherein said white resin film has a degree of whiteness of from 90 to 100%.

6. A white resin film as claimed in claim 1, wherein said ground calcium carbonate (b) has a particle size of from 3 to 4 µm.

7. A white resin film as claimed in claim 1, wherein said precipitated calcium carbonate (c) has a particle size of from 0.5 to 3 µm.

8. A white resin film as claimed in claim 7, wherein said precipitated calcium carbonate (c) has a particle size of from 1 to 2 µm.

9. A white resin film as claimed in claim 1, having a void volume of from 20 to 70%.

10. A white resin film as claimed in claim 9, having a void volume of from 25 to 50%.

11. A white resin film as claimed in claim 1, wherein said film is uniaxially stretched.

12. A white resin film as claimed in claim 1, wherein said film is biaxially stretched.

* * * * *